United States Patent
Derighetti

(12) 
(10) Patent No.: US 6,454,930 B1
(45) Date of Patent: Sep. 24, 2002

(54) PROCEDURE AND DEVICE FOR THE THREE-DIMENSIONAL PROCESSING OF A WORK PIECE BY MEANS OF ELECTROEROSIVE OR ELECTROCHEMICAL MACHINING

(75) Inventor: Réne Derighetti, Losone (CH)

(73) Assignee: Agie S.A., Losone (CH)

( * ) Notice: Subject to any disclaimer, the term of this patent is extended or adjusted under 35 U.S.C. 154(b) by 0 days.

(21) Appl. No.: 09/427,760

(22) Filed: Oct. 27, 1999

(30) Foreign Application Priority Data

Oct. 27, 1998 (DE) .......................... 198 49 577

(51) Int. Cl.⁷ .................. B23H 11/00; B23H 7/30; B23H 7/38
(52) U.S. Cl. .................. 205/645; 205/686; 204/222; 204/224 M; 204/225; 204/212; 219/69.17
(58) Field of Search .................. 204/224 M, 212, 204/225, 222, 290 R; 205/640, 645, 686; 219/69.17

(56) References Cited

U.S. PATENT DOCUMENTS

| | | | | |
|---|---|---|---|---|
| 3,324,021 A | * | 6/1967 | Haggerty ............... 204/224 M |
| 4,100,388 A | * | 7/1978 | Meyer ..................... 205/686 |
| 4,104,503 A | * | 8/1978 | Di Piazza et al. ....... 219/69.15 |
| 4,256,555 A | * | 3/1981 | Wilson et al. ........... 204/225 |
| 4,504,271 A | | 3/1985 | Inoue ...................... 219/69 |
| 4,999,093 A | * | 3/1991 | Moracz .................... 205/686 |
| 5,244,548 A | * | 9/1993 | Bruns et al. ............. 204/225 |
| 5,313,038 A | * | 5/1994 | Kildes .................... 219/69.17 |

FOREIGN PATENT DOCUMENTS

| | | |
|---|---|---|
| DE | 30 36 462 | 4/1981 |
| DE | 32 03 605 | 9/1982 |
| DE | 33 36 034 | 4/1985 |
| EP | 0 555 818 | 8/1993 |
| JP | 5-77113 | 3/1993 |
| JP | 10-128624 | 5/1998 |
| JP | 10-156631 | 6/1998 |
| JP | 10-277846 | 10/1998 |
| JP | 11-285923 | 10/1999 |

* cited by examiner

*Primary Examiner*—Donald R. Valentine
(74) *Attorney, Agent, or Firm*—Burns, Doane, Swecker, & Mathis, L.L.P.

(57) ABSTRACT

A procedure and a device for the electroerosive or electrochemical machining of bent surfaces of a work piece (2) by means of an electrode (1; 1'; 1") which is generally independent of the form of the bent surface, in which the electrode (1; 1'; 1") is led for the machining of the bent surface along a forward feed device (V) above the work piece surface. The invention is distinguished by the fact that the electrode (1; 1'; 1") is led across the work piece surface at an inclined angle to the forward feed device (V) with the forward feed device (V) placed tangentially to the work piece surface.

18 Claims, 5 Drawing Sheets

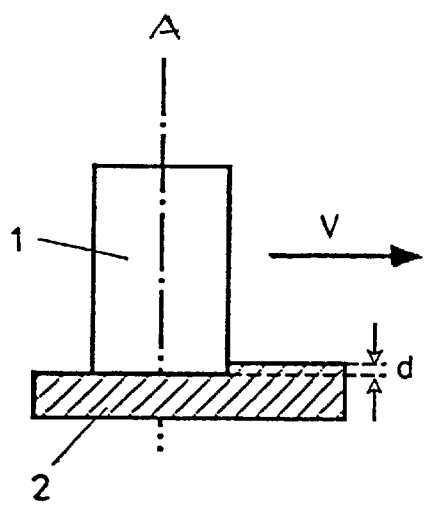
Fig. 1a
Prior Art
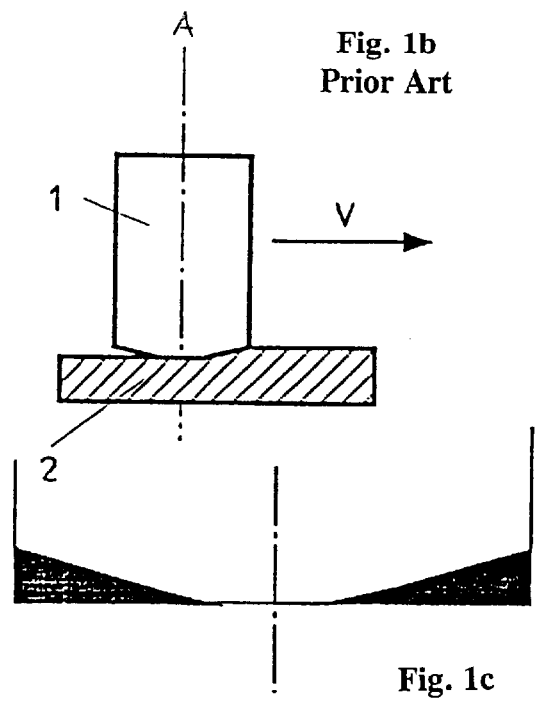
Fig. 1b
Prior Art
Fig. 1c
Prior Art
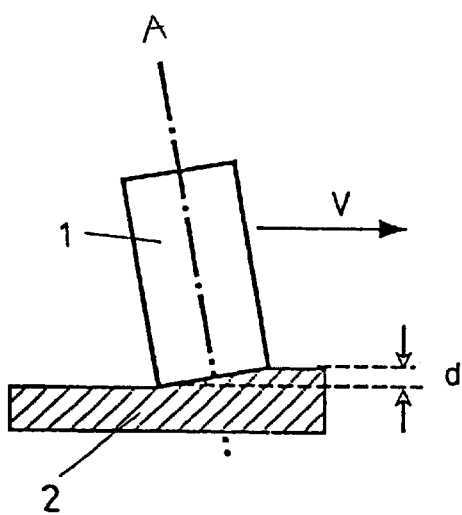
Fig. 1d
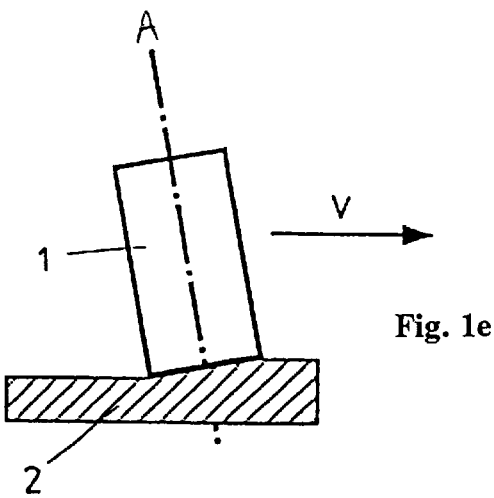
Fig. 1e
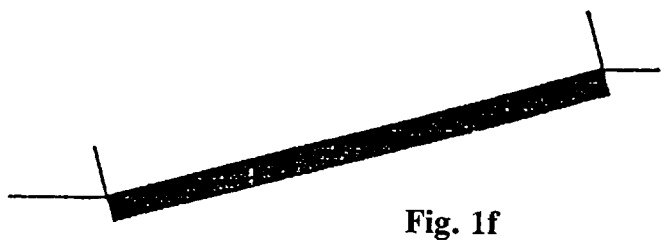
Fig. 1f

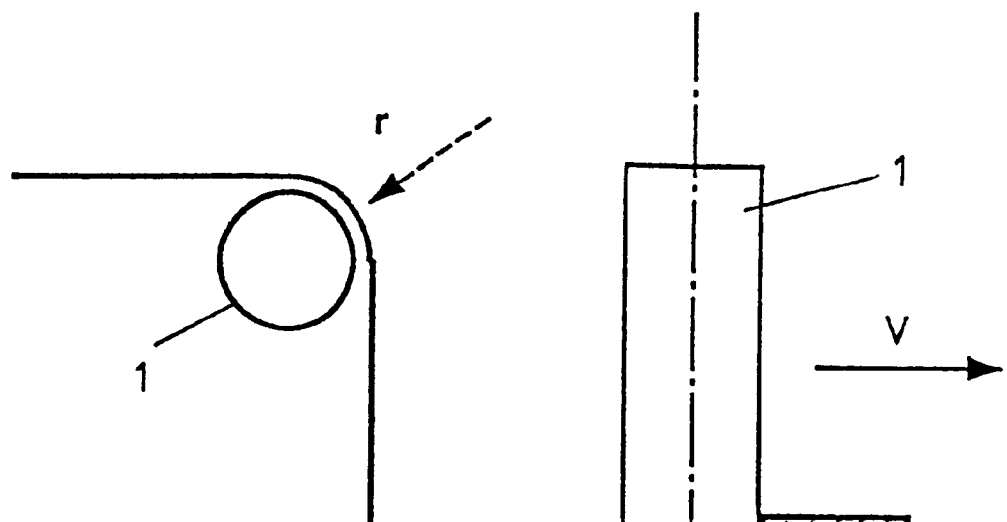
Fig. 2a
Prior Art
Fig. 2b
Prior Art
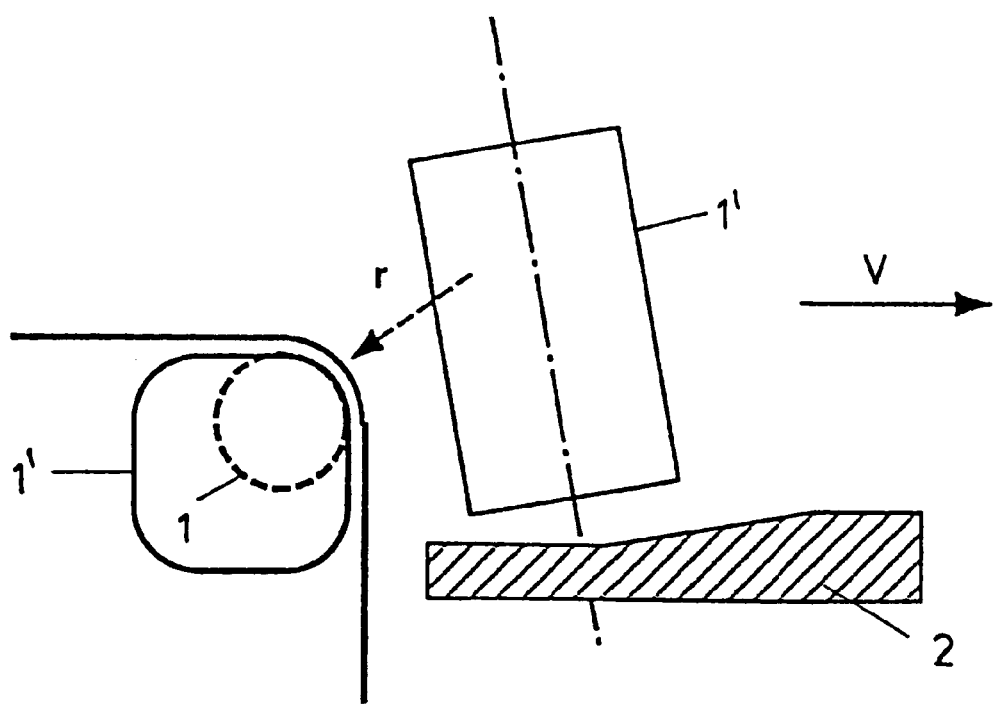
Fig. 2c
Fig. 2d

Fig. 3a
Prior Art
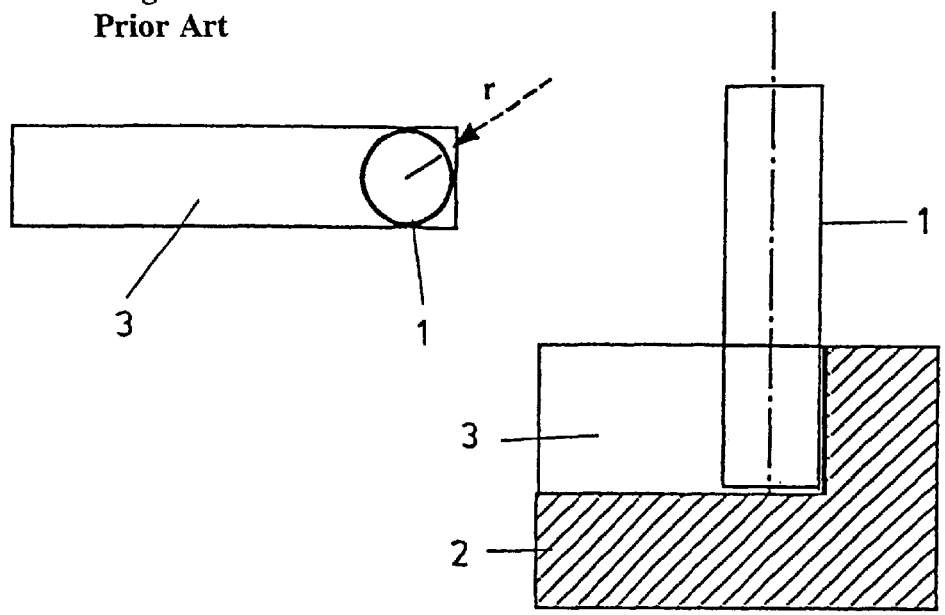
Fig. 3b
Prior Art
Fig. 3c
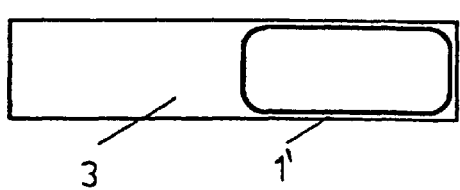
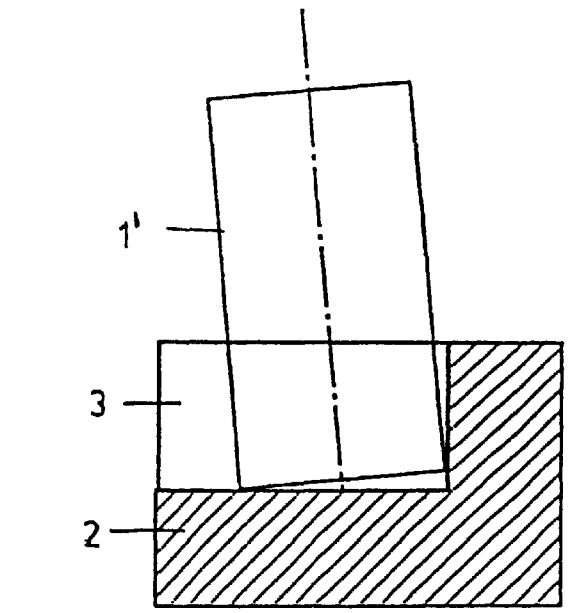
Fig. 3d

PROCEDURE AND DEVICE FOR THE THREE-DIMENSIONAL PROCESSING OF A WORK PIECE BY MEANS OF ELECTROEROSIVE OR ELECTROCHEMICAL MACHINING

This application claims priority under 35 U.S.C. §§ 119 and/or 365 to 198 49 577.3 filed in Germany on Oct. 27, 1998; the entire content of which is incorporated by reference.

BACKGROUND

1. Field of the Invention

The present invention concerns a procedure and a device for the three-dimensional electroerosive (EDM) or electrochemical (ECM) machining of bent or uneven surfaces of a work piece by means of an electrode which is generally independent of the form of the bent surface.

2. Description of Related Art

Electroerosion devices are known as state of the art in which a slim electrode "mills" a bent surface, whereby the shape of the electrode is not dependent on the bent surface. For this purpose, the work piece is clamped on a work table which, if necessary can be moved in the X, Y or Z direction. To produce the bent surface, the electrode is led in the direction of the work piece, erosion impulses in the form of voltage impulses are placed against a die electrode and the processing gap between electrode and work piece is rinsed. The electrode is led across the work piece surface like a milling machine and pares off the individual sections of the work piece to be eroded layer by layer to form the desired bent surface. This procedure promotes a high degree of wear and tear which has to be compensated for.

Such an electroerosion device is known from U.S. Pat. No. 4,505,721, operating with a hollow electrode through which the rinsing liquid flows during the machining into the machining gap.

From the summary of the Japanese Patent Publication No. JP-10-128 624 another electroerosion device is known in which the electrode for the erosion of a bent surface is tracked in its angle of inclination during the forward feed motion. The electrode is led in such a manner that it is always vertical to the tangential direction of the forward feed direction.

It is basically impossible to prevent wear and tear on the electrodes during the erosion procedure, which has the effect that the shape of the electrode changes during the machining. If the electrode is also set into rotation during the machining, the result is, for example, the wear profile on the electrode as shown in the right lower half of FIG. 1a.

From EP 555 818 A1 an electroerosion device is known, for example, on which the electrode is set into rotation. It also calculates the wear and tear on the electrode during the machining and from this the correction for the forward motion directions derived, which is shown as an overlay of the forward motion in the X, and Y plane and a tracking motion of the electrode in the Z direction. As is described in this publication, the wear profile changes in dependence of several parameters. However, this also changes the working surface of the electrode in dependence of the wear and tear condition. Thus, with a given generator setting, there is a certain wear and tear (use rate) and a corresponding wear profile.

In order to maintain a machining precision, the wear and tear has to be kept to as constant a level as possible. For this reason, it is only possible to remove layers that are progressively thinner during sequential machining steps in the direction of smoother and smoother surfaces (up to fine finishing).

It is also known, for example, to measure the electrode wear and tear and to compensate by tracking of the electrode according to the measured values. Such an electroerosion device is known, e.g., from DE 30 36 462 A1, in which the electrode—in addition to its motion in the X, Y and Z directions—is also set to vibrate during the "milling" of the concave surface. The vibrations are then registered by a detection device for the purpose of the determination of the wear and tear of the electrode.

In this device, the minimum radius which can be eroded is dependent on the width of the machining gap and the radius of the electrode. For this reason, only electrodes with a small diameter, thus thin cylindrical electrodes with a small working surface are used. To make it possible to still attain a sufficient rate of erosion, the electrode is set in rotation to support the rinsing. This measure allows increasing the maximum admissible current density and thus also the paring rate.

However, thin electrodes have the disadvantage that they are not rigid enough and bend under the effect of the rinsing and erosion forces which reduces the machining precision. In addition, a possible collision between the thin electrode and the work piece etc. can lead to a plastic reshaping of the electrode.

In general, the known devices have the following disadvantages: the electrode profile or the electrode geometry changes during the processing, in particular, with lateral electrode wear and tear. In addition, the electrodes are not sufficiently rigid against bending. For this reason, the attainable machining precision is severely limited in the known devices.

From DE 33 36 034 C2 an electrical discharge erosion device is known in which a rod-shaped electrode with circular or angular cross section is moved along a pre-programmed forward feed track. The forward feed tracks run layered in parallel planes. During faulty operation the electrode is moved away from the surface to be machined along a retraction path designed for each machining point. Due to the retraction paths, which have been calculated in advance, there are no unnecessary time delays during the retraction motion.

From DE 32 03 605 A1 another electrical discharge erosion device with a rotatable electrode is known. Parallel to its lengthwise axis, the electrode has several differing machining sides (varying profiles) which can be called upon, depending on the rotation position, for the machining of the work piece.

OBJECTS AND SUMMARY

An object of the present invention is to maintain the electrode profile essentially constant during machining.

According to the present invention, when an electrode is led in a forward feed direction tangentially to the surface of the work piece, the lengthwise axis of the electrode is inclined away from a normal to the work piece surface such that the end not facing the work piece is directed away from the forward feed direction. The advantage gained with this, as compared to the state of the art, is that the working surface of the electrode can be twice as large. This means that with the same current density, the current can suitably be doubled and thus the paring rate can be more than doubled. This can be clearly seen, e.g., from the comparison of FIGS. 1a and 1*b* to FIGS. 1*d* and 1*e*. On the electrode shown in FIG. 1*a* from the state of the art, the working surface is solely located on the bottom surface of the electrode—seen in the forward feed direction of the electrode—in the front section. Based on the wear of the electrode in the front section and simultaneous rotation of that section towards the rear, the rear section of the bottom surface of the electrode no longer participates in the erosion. However, in the invention, due to the incline of the lengthwise axis of the electrode from the normal of the work piece surface, the full bottom surface of the electrode participates in the erosion.

This also considerably improves the rinsing conditions. The maximum pressure drop is no longer—as in the state of the art—at the rear of the section of the wider machining gap, not used for the erosion, but equally distributed over the full active machining gap.

Another decided advantage is that the profile of the electrode only changes very little during its wear. The electrode wears off evenly along its bottom surface which allows simple compensation by the respective pushing up of the electrode. It does not change the profile.

In this manner the decisive advantage of an electroerosion device as compared to a mechanical milling device one can be further exploited, i.e., no relative motion between the work piece and the tool in the form of a rotation or similar is needed. This advantage in particular could not sufficiently be utilized with the known electroerosion devices as they had to be rotated in principle due to the uneven wear of the electrode. Such a rotation is no longer necessary with this invention.

This also opens another great advantage of the invention, i.e., that it is possible to work with prismatic electrodes which may not be rotated during machining. With a suitable prism shape (with sharp outside edges) it is thus possible—contrary to the state of the art—to advantageously erode a great number of smaller radii, e.g., a great number of narrow corners etc.

In addition, for the erosion of small radii it is an advantage that specially thin electrodes are no longer needed. With the use of prismatic electrodes it is possible to retain a large cross section on them which means that larger working surfaces and an overall greater rigidity of the electrode. Thus, it is possible to again pare off three-dimensional surfaces with greater speed and precision.

The term "forward feed direction of the electrode" means that direction in which the electrode holder is moved to advance on a given erosion track. Instead of or in addition to the motion of the electrode holder it is also possible to move the tool table with attached tool accordingly. The term "work piece surface" refers to the possibly bent, unmachined surface section which is located in the area of the electrode and is supposed to be treated next.

In order to obtain a bent surface according to the process of the invention, at least one other axis to incline the electrode is needed.

In general the shape of the electrode is independent of the shape of the bent surface to be machined. However, it can be an advantage in many cases to adapt the electrode to the shape of a particularly difficult to machine section of the bent surface. This means that the electrode for smaller segments of the bent surface may very well be dependent on its shape.

It is preferred to adjust the ejection angle in dependence of the machining quality, whereby the particularly preferred ejection angle is returned towards zero during the last fine machining. In an advantageous manner it is here possible to increase the paring rate for the coarser machining steps by a corresponding wider angle or incline of the electrode, whereby the inclination angle is reduced in favor of machining precision for the fine machining steps.

It is preferred that material is removed from the depth of the work piece in layers.

In one embodiment of the process it is preferred that the electrode is lifted off the surface of the work piece along the direction of its lengthwise axis and then repositioned on the work piece surface tangentially to the work piece surface. This measure permits a particularly rapid interruption of the process embodiment and the progressive restart of the erosion.

In a preferred manner, the electrode is rotated at intervals or continuously during the machining. It is preferred in the case of electroerosive treatment with a prismatic electrode that the electrode be retracted from the work surface before rotation. The advantage is that in this manner compensation is made even for the last remaining irregular wear and tear of the electrode.

For an advantageous increase in the speed of the rinsing liquid, the electrode in electroerosive or electrochemical machining is set to vibrate.

In a preferred manner, the electrode is centrally rinsed, whereby for rinsing the electrode sucks in the rinsing liquid and the rinsing pressure is controlled. This combination of central rinsing and sucking in of the rinsing liquid has the advantage to attain, on the one hand, a high rinsing liquid speed and, on the other hand, obtain a pressure drop primarily in the erosion gap.

In the case of electroerosive machining the duration of the erosion impulses, particularly during pressure rinsing is preferably selected somewhat lower than the flow time of a discharge that would arise in the electrode center and extinguish itself independently at the electrode edge. In an advantageous manner it would be possible with this measure to select the erosion impulse to be as long as possible, almost to that of direct current erosion.

In a preferred manner the erosion voltage is monitored for change in the electric arc voltage and/or in the overriding maintained wave and on deviation of the set value, the erosion impulse is canceled. A damaging of the electrode can in this manner be advantageously prevented.

In a preferred manner the electrode is coated with a lateral insulation layer. This insulation layer, which preferably is very thinly applied, acts to prevent damage to the lateral wall of the electrode. Such an electrode can also be used independent of the device according to the invention, e.g., in known electroerosion devices, in order to reduce the lateral wear of the electrodes there.

BRIEF DESCRIPTION OF THE DRAWINGS

Below, other advantages and characteristics of the invention are explained in more details based on the enclosed drawings.

FIG. 1*a* shows a rotating electrode while paring a layer from a work piece at the beginning of a known procedure;

FIG. 1*b* shows the electrode in the course of the machining according to the known procedure; and FIG. 1*c* shows the corresponding wear profile of the electrode;

FIGS. 1*d* through 1*f* are analogous to FIGS. 1*a* through 1*c* and show a corresponding electrode during paring of a layer using a procedure according to the present invention;

FIG. 2*a* shows a top view of electrode during eroding of a corner; and

FIG. 2b shows a cross section of FIG. 2a according to the known procedure;

FIGS. 2c and 2d show an electrode with a square cross section during eroding the same corner using a procedure according to the present invention;

FIG. 3a shows a top view, and

FIG. 3b shows a cross section of the eroding of a small groove using a known procedure;

FIG. 3c shows a top view, and

FIG. 3d shows a cross section of the eroding of a small groove using the present invention;

DETAILED DESCRIPTION OF THE PREFERRED EMBODIMENTS

Figure 4:
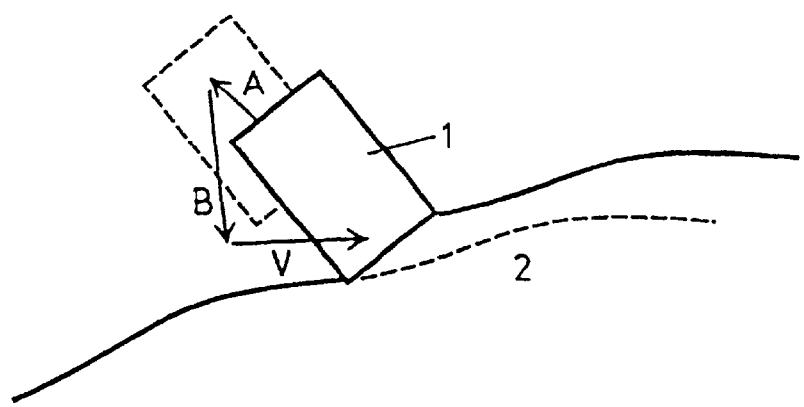
FIG. 4 shows the retraction motion of the electrode in case of a procedural deterioration and the subsequent resetting motion of the electrode for continuing of the machining.

For easier reading of the description, terms such as "above", "below" etc. will be used subsequently, whereby these terms should not be understood to be restrictive. In addition, a principal axis system for an electroerosion device is selected in such a manner that the X and Y main axes for a device set on the ground will in each case run horizontally and the main Z axis correspondingly vertical. However, this also should not be understood to be restrictive. For a coordinate system in any desired direction a transformation of the here used coordinate system can be done, so that the definitions used in the whole document for the forward feed direction and the electrode guidance will continue to be valid.

In FIG. 1a an electrode 1 is shown for the layer by layer paring of a work piece 2 at the beginning of a known procedure. The electrode 1 is set on the work piece 2. In the course of the machining, the layer thickness d is to be pared off. For this purpose the electrode 1 is moved along the forward feed direction V. In FIG. 1b the processing has already advanced whereby the electrode 1 has suffered some wear and tear. The wear profile is shown enlarged in FIG. 1c. The black areas represent the worn off sections of the electrode 1. The symmetrical wear profile results from a rotation of electrode 1.

Shown in FIGS. 1d and 1e is a corresponding electrode 1 during the paring of layer d from the work piece 2 at the start (FIG. 1d) and during the course of the machining (FIG. 1e) using a process according to the present invention.

Below, a frequently occurring work piece machining is explained as an example. For this purpose, the following definitions are introduced: the XY main plane is that plane which is fixed by the X and Y main axis of the machine tool. In general, the main axes on an electroerosion device are defined in such a manner that the horizontal work piece plane, i.e., the horizontal outside surface of a work piece mounted on the device extends parallel to the XY main axis. The forward feed of the electrode holder for the three-dimensional eroding within this work piece also occurs parallel to this main plane for the layer by layer paring.

To compensate for its wear and tear, as well as for eroding, the electrode is moved along the Z axis into the depth (in one opening or along its vertical outside wall) or along a vertical outside surface of the work piece. If, for example, ramps, i.e., sloping planes, are eroded on a work piece surface, the forward feed is no longer parallel to the XY main axis, but additionally also along the Z main axis. If, for example, a lateral wall of a deeper groove in a work piece is eroded, the general forward feed is parallel to the Z main axis. In FIGS. 1a, 1b, 1d, and 1e, the forward feed runs in the direction of the X main axis, thus parallel to the XY main plane.

In the known procedure, the lengthwise axis A of the electrode 1 is arranged perpendicular to the forward feed direction V, while in the procedure according to the invention, the lengthwise axis of electrode 1 is set at an angle of more than 90° with respect to the forward feed direction V. During machining, the electrode 1 is moved at an inclined angle, across the work piece surface. Shown in FIG. 1f is the wear profile of electrode 1 in the procedure according to the present invention. As can be seen, there is an even wear of the electrode 1 across its whole lower surface.

The incline of the lengthwise axis of the electrode 1 according to the present invention, as compared to normal on the work piece surface when the forward feed direction V is tangential to the work piece surface thus also comprises the incline of the lengthwise axis of electrode 1 compared to normal on the work piece surface if the forward feed direction is parallel to the main XY axis or to the Z main axis.

In FIGS. 2a and 2b, the electrode 1 is shown during the eroding of a corner with a radius r in a top view and cross section, respectively, according to a known procedure. The electrode 1 is again placed vertically with respect to the forward feed direction V.

In FIG. 2c, an electrode 1' with a substantially square cross section, analogous to FIG. 2a, is shown eroding the same corner using a procedure according to the invention. In the procedure according to the invention, the electrode 1' does not have to be rotated in order to maintain an even wear and tear or for increasing the rinsing, so that one edge of the square electrode 1' can erode the corner. For an immediate size comparison, the cross section of the analogously used rotating electrode 1 in the known procedure is shown in FIG. 2d. The cross section of the square electrode may be much larger for the cutting of the same corner radius which has the effect that the rigidity as well as the working surface are greater and thus the processing precision and speed are increased.

When machining a larger recess in the work piece 2, it can proceed in a process according to the invention, e.g., as follows: The electrode 1 is moved at an angle to normal on the surface of the work piece from one edge of the recess to the opposite edge, whereby several such tracks are placed parallel next to each other in such a manner that the pared surface shows as little rippling as possible. At the edges, the electrode 1 is pivoted each time to the vertical position so that no ramp to the lateral wall remains on the edge. The electrode 1 can be moved to the next adjoining track along the lateral edge of the recess in an upright, i.e., vertical direction to the forward feed direction V so that the lateral wall will be shaped as vertical as possible. If the adjoining track is eroded in the direction counter to the forward feed direction V, the electrode 1 is again inclined correspondingly so that the bottom surface of the electrode fully abuts the layer to be eroded.

The optimal electrode moves, to erode, for example, a corner can be pre-programmed.

If a deep hole parallel to the Z main axis is to be eroded into the work piece 2, taking into account the size ratio of hole to electrode diameter, the electrode 1 is again led at an angle to the Z main axis so that the advantageous full use of the bottom surface of the electrode can be applied for the erosion. When, at a certain depth, the size ratio no longer permits the incline of the electrode 1 to the Z main axis, the electrode 1 is again pivoted parallel to main axis Z.

The respective electroerosion device has to have at least five degrees of freedom for such a freedom of motion: three for the motions in the X, Y and Z direction, one for pivoting the electrode 1 and one for the rotation of the electrode holder so that the pivoting plane can be rotated as desired.

Shown in FIGS. 3a and 3c in top views and in FIGS. 3b and 3d, in cross section, are in each case the erosion of a narrow groove 3 using the known procedure and that according to the invention, respectively. In the known procedure, the groove 3 with a width b is eroded by means of a cylindrical electrode 1 in such a manner that the attainable corner radii r of the groove 3 are, based on the electrode geometry, smaller or identical to half of the groove width. In the procedure according to the invention with otherwise identical machining conditions it is possible to work with a rectangular electrode 1' due to the elimination of the rotation requirement. The thus attainable corner radii now only depend on the contour definition of the rectangular electrode 1' and thus can be much smaller, i.e., with a sharper edge.

The guidance of the erosion process is the same as for the known EDM cavity sinking. In one process variation the electrode 1 is lifted off the surface to be treated in a suitable direction along its lengthwise axis so that the erosion surface of the electrode 1 is removed as fast as possible from the surface to be treated across its whole cross section. In other terms, all sections of the erosion surface should be removed as fast as possible from their next adjoining section to be machined. This process is shown in FIG. 4 by means of arrow A. The location of electrode 1 after retraction is shown in a broken line. This direction is automatically derived from the erosion profile of electrode 1 and adapted accordingly in order to minimize erosion interruptions.

For the resumption of the erosion, electrode 1 is set tangentially onto the working surface, as shown in FIG. 4 by means of arrow B. Subsequently, electrode 1 is moved again in the forward feed direction V for machining and simultaneously inclined appropriately until it has again achieved the position indicated by the uninterrupted line. When resuming the machining, the impulse frequency can be progressively increased.

If necessary, the electrode 1 can be rotated at given time intervals in order to compensate for the unavoidable remaining irregularities in wear and tear. For cylindrical electrodes 1, i.e., those with a round cross section, the rotation can occur during machining, while for all other shapes of electrodes, particularly for electrodes with prismatic cross section, electrode 1' is preferably retracted from the work surface before rotation. However, it is generally possible to combine for every type of electrode, including cylindrical electrodes 1, 1', the rotation with the retraction motion. The amplitude and direction of the retraction motion can be derived from the geometry to be eroded.

Even with the procedure according to the invention, there will be basic wear and tear of the electrode 1, as shown in FIG. 1b. This will be automatically compensated for by a forward feed of electrode 1 along its lengthwise axis by calculating the feed rate from the product from erosion current and erosion time. The proportionality factor for each electrode type, dependent on material, shape and cross section, is stored in memory as technical parameter.

Figure 5:
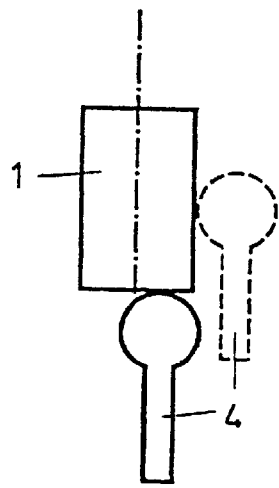
FIG. 5 shows the measuring of the electrode wear and tear by means of a measuring ball.

The calculated rate of wear and tear can be checked at intervals by measuring the electrode 1 on a measuring ball 4 (a measuring scanner or another measuring device on the device) during the machining which results in a higher machining precision. This is shown in FIG. 5 schematically based on electrode 1 and measuring ball 4. As can be seen from this figure, the measuring ball 4 measures not only the length of the electrode 1 but also its lateral wear profile.

Figures 6A, 6B:
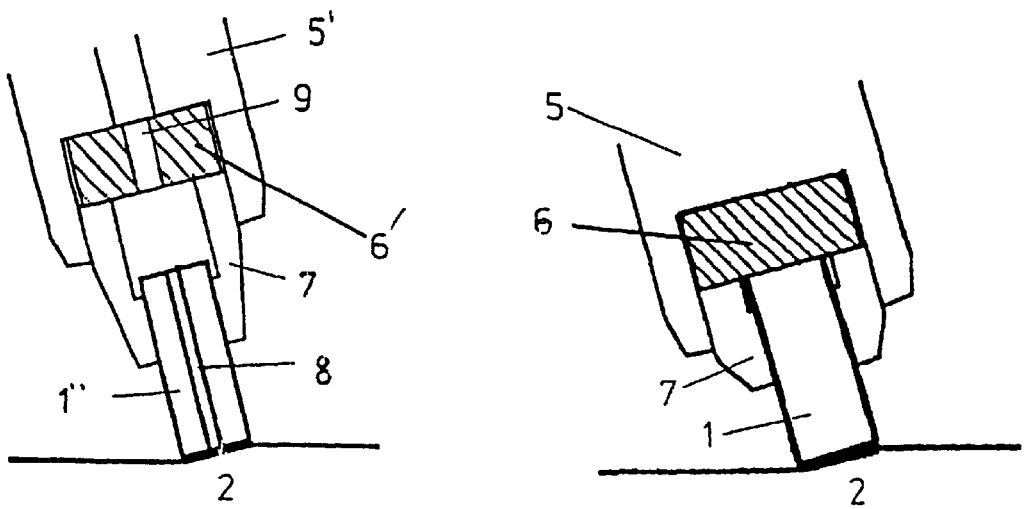
FIGS. 6a and 6b show special electrode holders, respectively, with a built-in piezoelectric translator to set the electrode to vibrate.

In FIGS. 6a and 6b it is shown how the current density flowing through the erosion gap can be increased. For this purpose a piezoelectric translator 6, 6' is built into the electrode holder 5, 5' which can s set the electrode 1, 1" in vibration through a holder segment 7. The rinsing amount and thus also the current density can be increased through the vibration of the electrode 1, 1". Electrode vibration is particularly suitable for electrodes 1, 1" with a small cross section and thus a small working surface because with these electrodes 1, 1" the hydrodynamic forces remain small. For such electrodes 1, 1", the electrode holder 5, 5' (pinole) does also not have to be constructed too rigidly, as a bending due to hydrodynamic forces is only minimal.

It is also possible to use other suitable means instead of the piezoelectric translators 6, 6'. However, the latter are particularly suitable due to the high vibration frequency that can be attained with them, which preferably is above the natural frequency of the electroerosion device. Shown in FIG. 6a, is a corresponding electrode holder 5' for a hollow electrode 1" with a rinsing canal 8, whereby the piezoelectric translator 6' also has an inside bore 9 through which the rinsing liquid can flow. In comparison, FIG. 6b shows an electrode holder 5 for a solid electrode 1 without a rinsing canal in which the piezoelectric translator 6 has no inside bore.

As already stated, it is possible in the procedure according to the invention to use electrodes 1" with a central rinsing and rinsing pressure control. It is advantageous to further increase here the current density which leads to a superproportional increase in the paring rate. In combination with the procedure according to the invention, the effect of central rinsing is optimal as the pressure drop occurs mainly in the erosion gap. This can be seen best in the comparison of FIGS. 1b and 1e. In the known electrode guidance, the erosion gap on the left is the greatest due to the symmetrical wear of the rotating electrode 1. Accordingly, the largest amount of rinsing liquid flows through there and leads there to the greatest pressure drop. In the procedure according to the present invention, the erosion gap is equal across the full bottom surface of the electrode so that the pressure drop is essentially constant across the whole bottom surface.

The electroerosion device can be constructed in such a manner that it creates in the machining gap a rinsing liquid speed of several meters per second. This measure permits the increase of the paring rate as compared to conventional EDM cavity sinking devices by a factor of 20. To produce this high rinsing liquid speed it is possible to use either an artificial outside pressure (e.g., by means of a suitable pressure container) or the rinsing liquid can be suctioned off through a rinsing canal of a (if necessary short and simply constructed) hollow electrode with rinsing canal.

In both cases the controlled arc runs from the electrode edge in the direction of the rinsing canal within the electrode and is securely extinguished in the rinsing canal (DE 27 33 430 C2). The arc is carried along by the rinsing liquid and thus extended. With enough lengthwise extension of the arc it extinguishes itself.

With the first measure it is possible to attain such high rinsing liquid speeds that erosion with direct current is even possible. However, the design with a suitable pressure container hinders the three-dimensional erosion. This disadvantage does not occur with the second measure, whereby usable speeds can still be attained.

Figure 7:
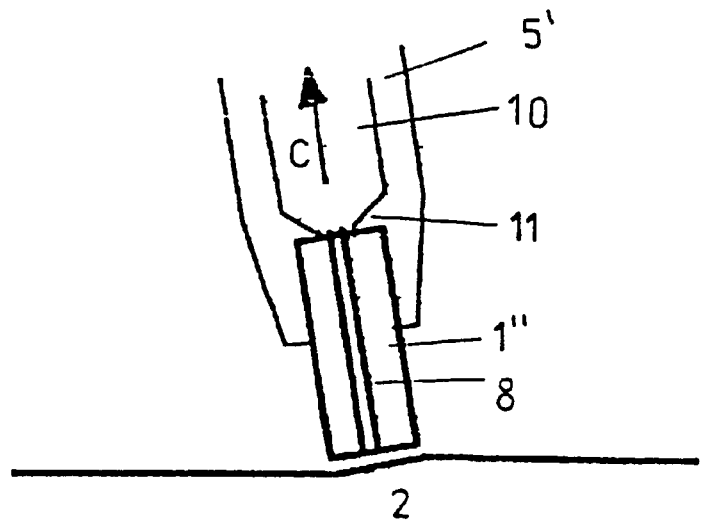
FIGS. 7 shows an electrode holder specially constructed for suctioning of the rinsing liquid through the electrode.

The electrode holder 5 can be constructed in such a manner that a pressure drop at the junction between electrode 1" and the electrode holder 5 is kept small. In FIG. 7 it is schematically indicated how such an electrode holder 5' could be constructed. The upper side of the collar 11 is constructed conically and opens upward so that no erosion particles accumulate above a collar 11. The arrow C in FIG. 7 indicates the flow direction of the rinsing liquid.

In principle, the rinsing from the center of the bottom surface of the electrode in the direction of the electrode edge has the advantage to preserve the freedom of motion. The rinsing pressure can always be increased in such a manner that the required dielectric speed in the erosion gap is attained. However, it is not always possible to securely extinguish the direct current arc at the outer electrode edge. This has the effect that the electrode 1" is damaged at its edge or suffers excessive wear and tear. In order to counter this effect the duration of the erosion impulse is regulated such that it is as long as possible but always shorter than the flow time of a discharge which arises in the electrode center and would extinguish itself at the electrode edge.

It is also possible to monitor—additionally or alternatively—a change in the arc tension and extinguish the erosion impulse when it deviates from the set value. This deviation from the set value can be monitored by an evaluation of the tension, for example, based on the amplitude course and/or based on the amplitude and frequency of the superimposed maintained wave.

Figure 8:
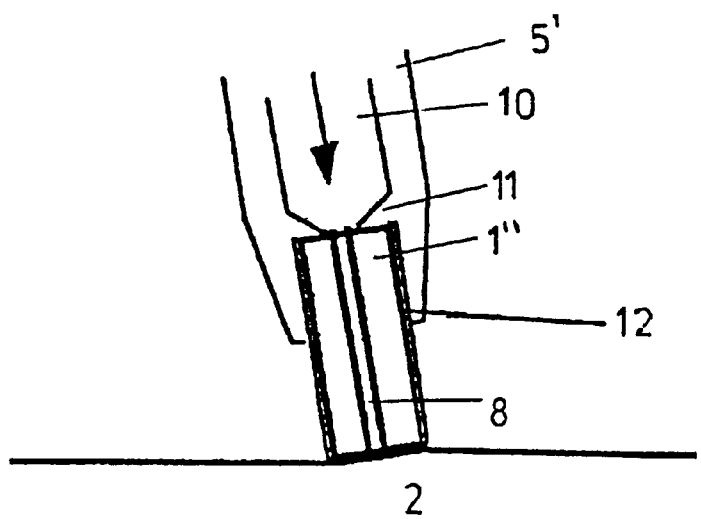
FIG. 8 shows an electrode with a lateral insulation coating.

For reduced wear and tear on the electrodes it is possible to use graphite electrodes. In addition, it is possible to coat the electrode 1" with a lateral insulation layer 12 which can endure high temperatures for short times. During machining, this insulation layer 12 is also worn away during the course of the wear and tear on the electrode 1" due to thermal and mechanical effects. For this reason the insulation coating is made very thin. FIG. 8 shows such an electrode 1" with a lateral insulation coating 12.

The control of the electroerosion device can be constructed in such a manner that the dimensions, the shape and/or the information about the forward feed direction of electrode 1 are recorded directly from a CAD system and used by suitable software to control the machine tool. This helps to reduce the machining time. The dimensions of electrode 1 or the generally in a certain electro-erosion device used electrodes (for example, electrodes stored in an electrode magazine which can be exchanged as needed by the machine tool), as well as the required technical parameters are stored in memory. Included in these technical parameters are the optimal electrode angle or change of angle for the machining of basic shapes, such as inner and outer corners.

It is also possible to essentially precalculate online, alternatively or supplementally, the forward feed motion of electrode 1 during the machining. The whole control can be arranged in such a manner that it recommends currently in the electroerosion device not available electrode shapes and/or dimensions which could lead to a shortening of the machining time or similar. Should these shapes and/or dimensions be basically not available, the control of the machining can automatically be done with the available electrodes 1.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A procedure for the electroerosive or electrochemical machining of a surface on a work piece by means of an electrode having a shape and a lengthwise axis, the procedure comprising the steps of:

leading the electrode for the machining of the surface along a forward feed direction over the work piece surface; and during the forward feed of the electrode, inclining the lengthwise axis of the electrode against a normal of the work piece surface in such a manner that an end of the electrode that is not facing the work piece is inclined away from the forward feed direction and so as to machine the surface of the work piece to a shape that is independent of the shape of the electrode.

2. The procedure according to claim 1, wherein the inclined angle is adjusted in dependence on the machining quality.

3. The procedure according to claim 2, wherein the inclined angle is reset towards zero during a last fine machining.

4. The procedure according to claim 1, wherein the electrode is lifted off the work piece surface in a direction of its lengthwise axis and subsequently reset onto the work piece surface essentially tangentially to the work piece surface.

5. The procedure according to claim 1, wherein a duration of erosion impulses is selected somewhat shorter than a flow time of a discharge which arises on the electrode center and would extinguish itself on the electrode edge.

6. The procedure according to claim 1, wherein an erosion voltage is monitored regarding a change in the arc tension and/or the superimposed maintained wave and an erosion impulse is extinguished when it deviates from the set value.

7. The procedure according to claim 1, wherein dimensions, the shape and/or the information about the movement of the electrode is read from data on a CAD system and the read data is used for the control of the machine tool.

8. A procedure for the electroerosive or electrochemical machining of a surface on a work piece as recited in claim 1, wherein the electrode machines a top surface on the work piece.

9. A procedure for the electroerosive or electrochemical machining of a surface on a work piece by means of an electrode having a lengthwise axis, the procedure comprising the steps of:

leading the electrode for the machining of the- surface along a forward feed direction over the work piece surface; and during the forward feed of the electrode, inclining the lengthwise axis of the electrode against a normal of the work piece surface in such a manner that an end of the electrode that is not facing the work piece is inclined away from the forward feed direction;

wherein material is pared off into a depth of the work piece layer by layer.

10. A procedure for the electroerosive or electrochemical machining of a surface on a work piece by means of an electrode having a shape and a lengthwise axis, the procedure comprising the steps of:

leading the electrode for the machining of the surface along a forward feed direction over the work piece surface; and during the forward feed of the electrode, inclining the lengthwise axis of the electrode against a normal of the work piece surface in such a manner that an end of the electrode that is not facing the work piece is inclined away from the forward feed direction; and rotating the electrode during the machining either at time intervals or continuously, where in case of electroerosive machining, wear and tear on the electrode is compensated for by moving the electrode in a direction of its lengthwise extension, whereby the speed of this movement is derived from a calculation and/or measuring of the wear and tear of the electrode.

11. The procedure according to claim 10 wherein in case of electroerosive machining with a prismatic electrode the electrode is retracted from the work surface before rotation.

12. A procedure for the electroerosive or electrochemical machining of a surface on a work piece by means of an electrode having a shape and a lengthwise axis, the procedure comprising the steps of:

leading the electrode for the machining of the surface along a forward feed direction over the work piece surface; and during the forward feed of the electrode, inclining the lengthwise axis of the electrode against a normal of the work piece surface in such a manner that an end of the electrode that is not facing the work piece is inclined away from the forward feed direction and so as to machine the surface of the work piece to a shape that is independent of the shape of the electrode; where in case of electroerosive machining, wear and tear on the electrode is compensated for by moving the electrode in a direction of its lengthwise extension, whereby the speed of this movement is derived from a calculation and/or measuring of the wear and tear of the electrode.

13. A procedure for the electroerosive or electrochemical machining of a surface on a work piece by means of an electrode having a shape and a lengthwise axis, the procedure comprising the steps of:

leading the electrode for the machining of the surface along a forward feed direction over the work piece surface; and during the forward feed of the electrode, inclining the lengthwise axis of the electrode against a normal of the work piece surface in such a manner that an end of the electrode that is not facing the work piece is inclined away from the forward feed direction; and vibrating the electrode during electroerosive or electrochemical machining.

14. A procedure for the electroerosive or electrochemical machining of a surface on a work piece by means of an electrode having a shape and a lengthwise axis, the procedure comprising the steps of:

leading the electrode for the machining of the surface along a forward feed direction over the work piece surface; and during the forward feed of the electrode, inclining the lengthwise axis of the electrode against a normal of the work piece surface in such a manner that an end of the electrode that is not facing the work piece is inclined away from the forward feed direction and so as to machine the surface of the work piece to a shape that is independent of the shape of the electrode; where in a case of electroerosive machining, the electrode is centrally rinsed whereby for the rinsing, the rinsing liquid is suctioned in through the electrode and the rinsing pressure is controlled.

15. A device for electroerosive or electrochemical machining a surface on a work piece by means of an electrode having a shape independent of the surface, the device comprising:

means for leading the electrode along a forward feed direction over the work piece surface; and means for inclining a lengthwise axis of the electrode against a normal of the work piece surface in such a manner that an end of the electrode that is not facing the work piece is inclined away from the forward feed direction so as to machine the surface of the work piece to a shape that is independent of the shape of the work piece.

16. The device according to claim 15, wherein the electrode is coated with a lateral insulation layer.

17. A device for electroerosive or electrochemical machining a surface on a work piece by means of an electrode having a shape independent of the surface, the device comprising:

means for leading the electrode along a forward feed direction over the work piece surface; and means for inclining a lengthwise axis of the electrode against a normal of the work piece surface in such a manner that an end of the electrode that is not facing the work piece is inclined away from the forward feed direction such that the shape of the work piece surface is independent of the shape of the electrode;

wherein the means to incline the lengthwise axis of the electrode and the means for leading the electrode have at least five degrees of freedom of movement for moving the electrode, where in case of electroerosive machining, wear and tear on the electrode is compensated for by moving the electrode in a direction of its lengthwise extension, whereby the speed of this movement is derived from a calculation and/or measuring of the wear and tear of the electrode.

18. A device for electroerosive or electrochemical machining a surface on a work piece by means of an electrode having a shape independent of the surface, the device comprising:

means for leading the electrode along a forward feed direction over the work piece surface;

means for inclining a lengthwise axis of the electrode against a normal of the work piece surface in such a manner that an end of the electrode that is not facing the work piece is inclined away from the forward feed direction so as to machine the surface of the work piece to a shape that is independent of the shape of the work piece and;

an electrode holder with a piezoelectric translator which can vibrate the electrode.

* * * * *